(12) United States Patent
Amori et al.

(10) Patent No.: US 7,198,124 B2
(45) Date of Patent: Apr. 3, 2007

(54) VEHICLE AND ENERGY PRODUCING AND STORAGE SYSTEM FOR A VEHICLE

(75) Inventors: Rick Amori, Saline, MI (US); Frank Stellon, Northville, MI (US); Mike Veenstra, Southgate, MI (US); Deborah D. Pittman, Belleville, MI (US); Josephine Lee, Novi, MI (US)

(73) Assignee: Ford Motor Company, Dearborn, MI (US)

(*) Notice: Subject to any disclaimer, the term of this patent is extended or adjusted under 35 U.S.C. 154(b) by 320 days.

(21) Appl. No.: 10/789,511

(22) Filed: Feb. 27, 2004

(65) Prior Publication Data
US 2004/0173391 A1   Sep. 9, 2004

Related U.S. Application Data

(63) Continuation-in-part of application No. 10/248,953, filed on Mar. 5, 2003, now Pat. No. 6,736,229.

(51) Int. Cl.
*B60R 16/04* (2006.01)
(52) U.S. Cl. .................... 180/68.5; 280/834
(58) Field of Classification Search ............. 180/68.5, 180/69.5, 314; 280/830, 834; 137/267; 429/96, 97, 98, 99, 100; 296/193.07, 203.01, 296/204
See application file for complete search history.

(56) References Cited

U.S. PATENT DOCUMENTS

| | | | |
|---|---|---|---|
| 1,606,028 A | 11/1926 | Head | |
| 2,871,967 A | 2/1959 | Du Shane | |
| 3,565,201 A | 2/1971 | Petsinger | |
| 3,608,660 A | 9/1971 | Smith et al. | |
| 3,681,609 A | 8/1972 | Boese et al. | |
| 3,830,326 A | 8/1974 | Hartung | |
| 4,216,839 A * | 8/1980 | Gould et al. | 180/65.1 |
| 4,365,681 A * | 12/1982 | Singh | 180/68.5 |
| 4,616,872 A | 10/1986 | Akira et al. | |
| 5,156,225 A | 10/1992 | Murrin | |

(Continued)

FOREIGN PATENT DOCUMENTS

EP      0 338 609      10/1989

(Continued)

OTHER PUBLICATIONS

Autotech Daily, "Toyota to Show Fuel Cell/By-Wire Concept at Tokyo Auto Show", Oct. 15, 2003.

*Primary Examiner*—Christopher P. Ellis
*Assistant Examiner*—Brian Swenson
(74) *Attorney, Agent, or Firm*—David B. Kelley; Brooks & Kushman

(57) ABSTRACT

An energy producing and storage system for a vehicle includes a compressed gas storage tank having a generally cylindrical outer wall and a generally cylindrical battery having a partially triangular section defined in part by a concave surface extending along and nested with at least a portion of the cylindrical outer wall of the gas storage tank. The energy producing and storage system also includes a fuel cell disposed in a concavity formed in the vehicle body, thereby further minimizing the passenger and/or trunk space required to accommodate the system.

16 Claims, 4 Drawing Sheets

U.S. PATENT DOCUMENTS

| | | | |
|---|---|---|---|
| 5,193,635 A | 3/1993 | Mizuno et al. | |
| 5,501,289 A * | 3/1996 | Nishikawa et al. | 180/68.5 |
| 5,518,272 A | 5/1996 | Fukagawa et al. | |
| 5,562,178 A | 10/1996 | Worden et al. | |
| 5,641,031 A | 6/1997 | Riemer et al. | |
| 5,662,184 A | 9/1997 | Riemer et al. | |
| 5,704,644 A * | 1/1998 | Jaggi | 280/796 |
| 5,785,136 A | 7/1998 | Falkenmayer et al. | |
| 5,794,979 A | 8/1998 | Kasuga et al. | |
| 5,908,077 A | 6/1999 | Moore | |
| 6,042,071 A | 3/2000 | Watanabe et al. | |
| 6,085,854 A * | 7/2000 | Nishikawa | 180/68.5 |
| 6,095,267 A | 8/2000 | Goodman | |
| 6,213,145 B1 | 4/2001 | Crook et al. | |
| 6,220,380 B1 | 4/2001 | Mita et al. | |
| 6,220,383 B1 | 4/2001 | Muraki et al. | |
| 6,223,843 B1 | 5/2001 | O'Connell et al. | |
| 6,227,322 B1 * | 5/2001 | Nishikawa | 180/68.5 |
| 6,257,360 B1 | 7/2001 | Wozniak et al. | |
| 6,276,473 B1 | 8/2001 | Zur Megede | |
| 6,378,637 B1 | 4/2002 | Ono et al. | |
| 6,431,298 B1 | 8/2002 | Ruppert, Jr. et al. | |
| 6,468,480 B1 | 10/2002 | Clawson et al. | |
| 6,516,905 B1 | 2/2003 | Baumert et al. | |
| 6,548,199 B1 | 4/2003 | Tanaka et al. | |
| 6,571,895 B2 | 6/2003 | Weimer | |
| 6,598,691 B2 | 7/2003 | Mita et al. | |
| 6,843,336 B2 * | 1/2005 | Chernoff et al. | 180/65.1 |
| 6,902,020 B2 * | 6/2005 | Kronner et al. | 180/68.5 |
| 2002/0189873 A1 | 12/2002 | Mizuno | |
| 2003/0000758 A1 | 1/2003 | Bruck et al. | |
| 2003/0012998 A1 | 1/2003 | Bruck et al. | |
| 2003/0037973 A1 | 2/2003 | Chernoff et al. | |
| 2003/0134167 A1 | 7/2003 | Hirakata | |
| 2003/0148168 A1 | 8/2003 | Enjoji et al. | |

FOREIGN PATENT DOCUMENTS

JP 1-160755 6/1989

* cited by examiner

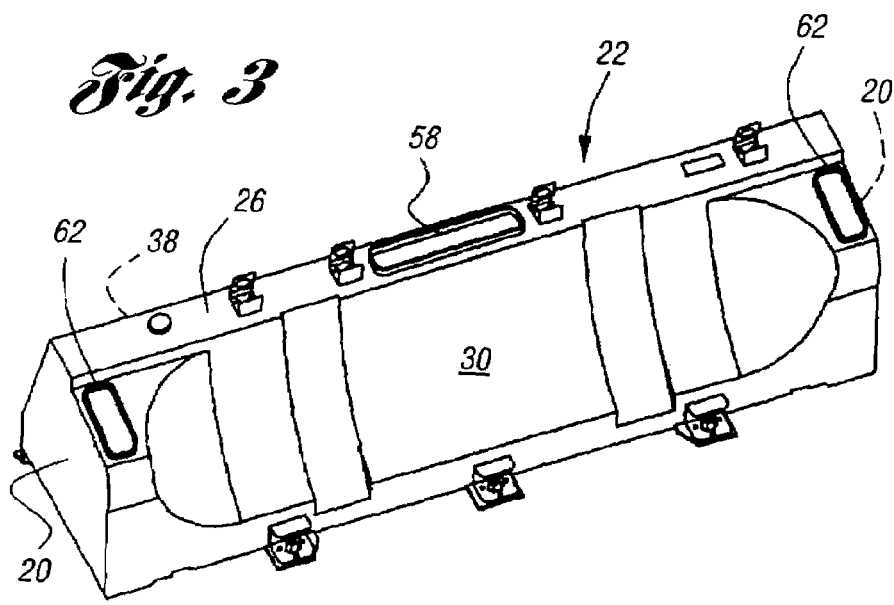
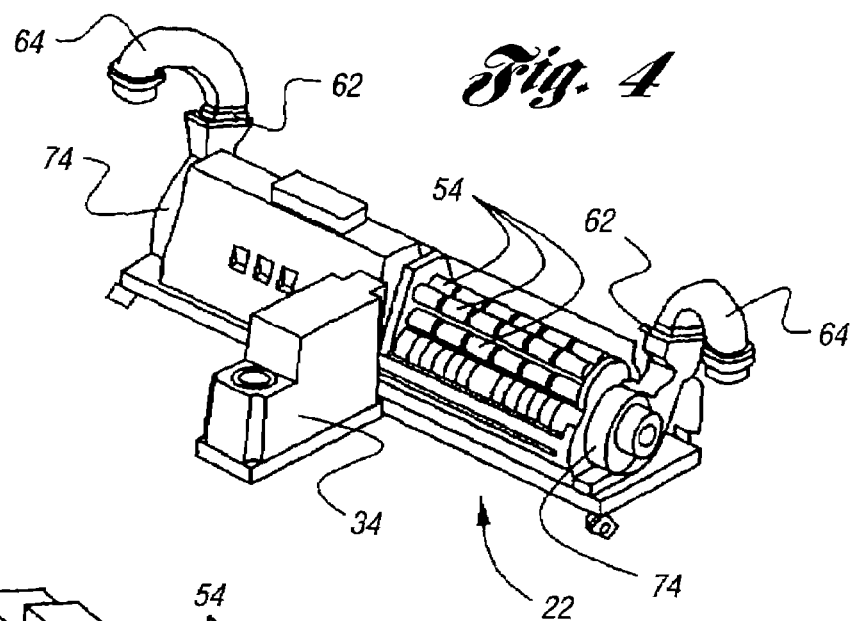
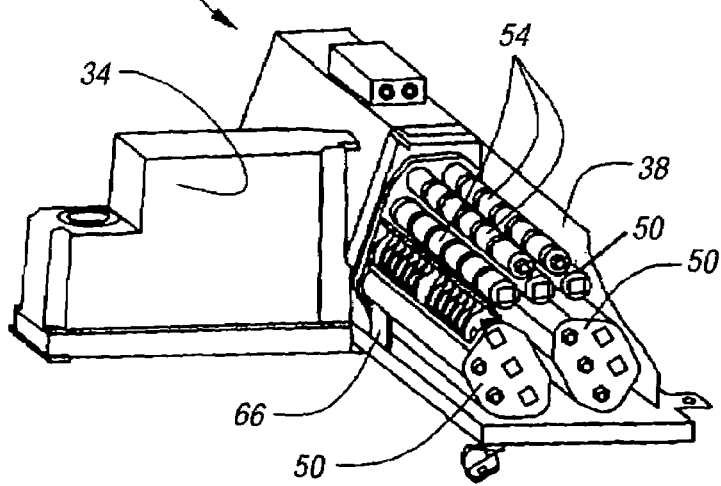

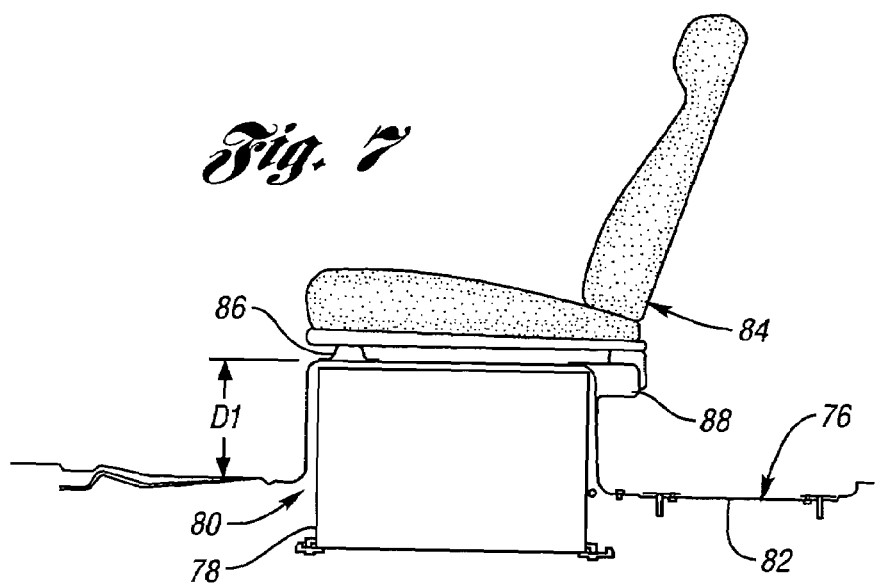
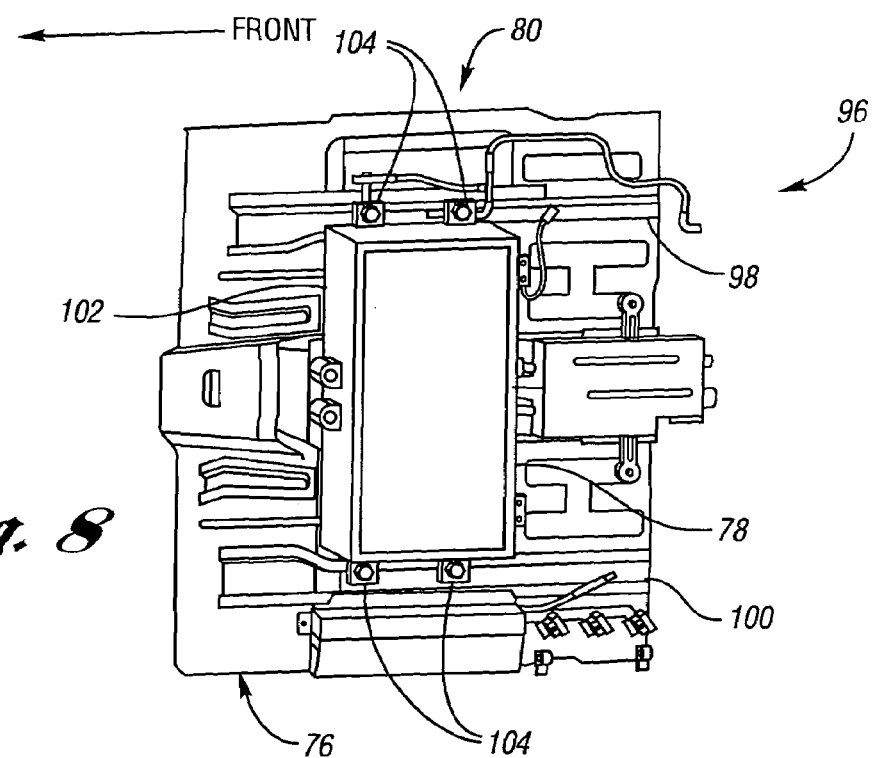
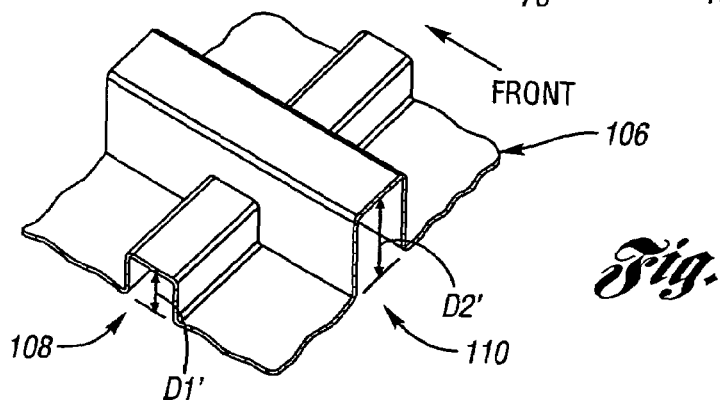

VEHICLE AND ENERGY PRODUCING AND STORAGE SYSTEM FOR A VEHICLE

This application is a continuation-in-part of U.S. application Ser. No. 10/248,953, filed Mar. 5, 2003, now U.S. Pat. No. 6,736,229.

BACKGROUND OF THE INVENTION

1. Field of the Invention

The present invention relates to a vehicle and an energy producing and storage system for a vehicle having a compressed gaseous fuel tank, an electric storage battery, and a fuel cell.

2. Disclosure Information

Vehicles such as hybrid electric vehicles having fuel-burning engines and fuel cell vehicles, both powered by compressed fuel gas such as natural gas or hydrogen, typically utilize generally cylindrical fuel storage tanks. The cylindrical geometry of such tanks is dictated by the relatively high pressures necessary to store an adequate amount of fuel. Needless to say, cylindrical tanks do not package well in automotive vehicles, notwithstanding that engineers have striven for years to achieve acceptable packaging coupled with acceptable vehicle range. The need for packaging an electrical storage battery within either a hybrid electric vehicle or a fuel cell vehicle further compounds the problems faced by vehicle designers. Such batteries are typically not package-efficient and in fact, have frequently been of either a flat construction or square sectional construction, neither of which is particularly conducive to packaging within the confines of an automotive vehicle.

The inventors of the present energy producing and storage system have solved many of the problems which plagued known battery and compressed gas storage systems by providing a nesting relationship between an electric storage battery and a generally cylindrical compressed gas storage tank. The geometry of the electric storage battery's case takes advantage of the geometry found in a conventional automotive vehicle at the forward point of the traditional luggage compartment, by conforming with the seat back bulkhead of the adjacent passenger compartment, and at the same time conforming with the cylindrical outer wall of the compressed gas storage tank.

SUMMARY OF THE INVENTION

An energy producing and storage system for a vehicle includes a gas storage tank for compressed fuel gas, with the tank having a generally cylindrical outer wall and two arcuate ends, and a generally cylindrical storage battery having a concave surface extending along and nested with at least a portion of the generally cylindrical outer wall of the gas storage tank. The battery preferably further includes at least one additional surface extending parallel to a wall of a vehicular compartment into which the gas storage tank and the storage battery are installed.

The concave surface of the storage battery defines one portion of a generally triangular cross section of the storage battery. The other two portions of the generally triangular cross section are defined by the floor of the storage compartment into which the gas storage tank and storage battery are installed and a segment of the battery's exterior surface which is generally planar and which is parallel to a seat back bulkhead defining an adjoining passenger compartment.

According to another aspect of the present invention, a storage battery has two generally quadrilateral ends abutting at least a portion of the arcuate ends of the gas storage tank. The generally quadrilateral ends include ports allowing the passage of cooling air into the storage battery.

The compartment into which the storage battery and gas storage tank are installed preferably extends laterally across the width of the vehicle body. The storage battery preferably further includes a plurality of battery cell groups, with each group extending axially in a direction parallel to the generally cylindrical outer wall of the gas storage tank. In this manner, the storage battery and the gas storage tank may be tucked into close proximity of the rear seatback of the vehicle, so as to minimize the space occupied by the storage battery and the gas storage tank.

According to another aspect of the present invention, a storage battery further includes a thermal management system for selectively passing either cabin or ambient air through the storage battery.

According to another aspect of the present invention, a method for providing an energy storage system for a vehicle includes the steps of securing a storage battery within a fuel storage compartment immediately adjacent a passenger compartment of the vehicle, with the storage battery having a first exterior surface which is generally planar and which is parallel to a seatback bulkhead defining an adjoining passenger compartment, and a second exterior surface which is concave, with the first and second surfaces combining with the surface which is parallel to the floor of the fuel storage compartment to define a generally triangular cross section of the storage battery. The present method further includes securing a cylindrical compressed fuel gas tank in the fuel storage compartment, with at least a portion of the fuel tank being nested with the concave surface of the storage battery.

The present invention also provides a vehicle including an energy producing and storage system. The system includes first and second portions which cooperate in a nesting relationship, thereby minimizing vehicle space usage. A vehicle body includes a floor having a first concavity formed therein for receiving a third portion of the system from outside the vehicle. The first concavity is configured to prevent at least some of the third portion from extending beyond the vehicle body, and is configured to minimize use of the vehicle occupant space.

The invention further provides a vehicle having a uni-body construction and configured to efficiently package a fuel cell system. The vehicle includes a fuel cell system including a fuel cell stack, a fuel tank, and a storage device for storing and providing electricity. The fuel tank and the storage device cooperate in a nesting relationship to minimize vehicle space usage. A first concavity is formed in a floor of the uni-body, and is configured to receive the fuel cell stack from outside the vehicle.

The invention also provides a method for packaging an energy producing and storage system in a vehicle. The vehicle includes a vehicle body having a floor with a first concavity formed therein. The method includes placing first and second portions of the system together in a nesting relationship, thereby minimizing vehicle space usage. A third portion of the system is placed in the first concavity from outside the vehicle such that at least some of the third portion does not extend beyond the vehicle body.

It is an advantage of the present invention that an energy producing and storage system according to this invention will allow maximum energy density within the fuel storage space of a hybrid electrical vehicle or fuel cell vehicle. In other words, a maximum amount of electrical charge storage and compressed gas storage will be permitted by the internesting relationship between the storage battery and the gas storage tank.

It is a further advantage of the present invention that the present energy producing and storage system will utilize minimum space within a laterally confined energy storage compartment within a vehicle.

It is another advantage of the present invention that the ability to use ambient air for cooling the storage battery reduces the need for conditioned air drawn from the vehicle's passenger compartment. This in turn reduces the amount of energy drawn from the battery system to operate a refrigeration system.

It is another advantage that the present system permits maximum bimodal energy storage within a minimum package volume.

Other advantages, as well as objects and features of the present invention, will become apparent to the reader of this specification.

BRIEF DESCRIPTION OF THE DRAWINGS

FIG. 3 is a perspective view of a storage battery according to one aspect of the present invention;

FIG. 4 is a front perspective view of the storage battery shown in FIG. 3;

FIG. 5 is a perspective view of a section through the battery of FIGS. 3 and 4 showing pluralities of battery cell groups within the storage battery;

FIG. 7 is a sectional view taken through lines 7—7 in FIG. 6, and including a vehicle seat;

FIG. 8 is a bottom perspective view of a portion of the vehicle shown in FIG. 6; and FIG. 9 is a perspective view of an alternative embodiment of a vehicle body in accordance with the present invention.

DETAILED DESCRIPTION OF THE PREFERRED EMBODIMENTS

Figure 1:
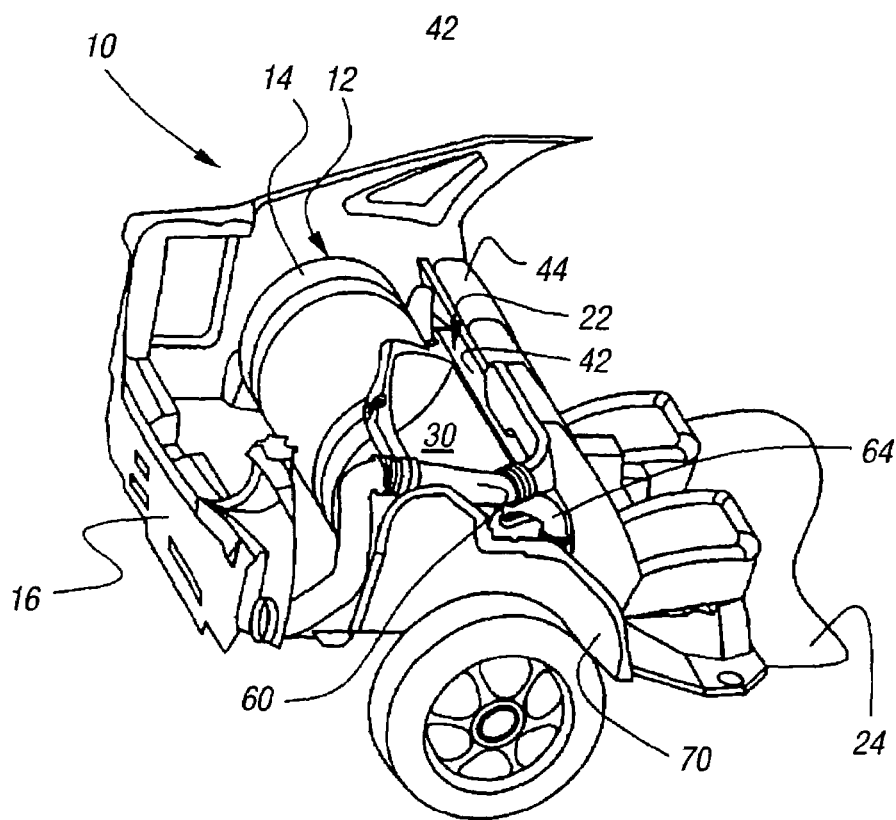
FIG. 1 is a side view of a vehicle having a energy producing and storage system according to the present invention.

As shown in FIG. 1, vehicle 10 has an energy producing and storage system that includes a first portion, or compressed gas storage tank 12, mounted transversely across the substantial width of the vehicle, with the tank being located behind seat back 44 and rear seat strainer or bulkhead 42. Because gas storage tank 12 has a conventional circular cross section necessitated by the high pressures encountered with compressed fuel gases such as compressed natural gas or compressed hydrogen, gas storage tank 12 creates a packaging problem which is solved by the present invention.

With fuel cell or hydrogen internal combustion engine (ICE) hybrid electric vehicles, for example, the fuel storage problem posed by the awkward configuration of compressed gas tanks is further compounded by the need for a substantial electric storage battery. As noted above, traditional batteries typically have a flat configuration which is not particularly advantageous for a vehicle such as a passenger car. This problem is compounded because a good portion of the traditional trunk is pre-empted by gas storage tank 12. Accordingly, the inventors of the present invention propose a second portion of the energy producing and storage system, or a storage battery 22, having a generally triangular cross-section. The battery itself has a generally cylindrical case 26. As used term herein, the term "generally cylindrical" does not refer necessarily to a right circular cylinder, but rather to a more generic definition of cylinder as embraced in classic geometry. FIG. 1 shows that storage battery 22 has a concave section in contact with gas storage tank 12. Thus, concave surface 30 extends along and is nested with at least a portion of the generally cylindrical outer wall 14 of gas storage tank 12. Gas storage tank 12 is mounted to floor 46 of vehicle 10. Similarly, storage battery 22 is mounted to floor 46. The floor contacting surface of storage battery 22 combines with concave surface 30 and slant surface 38 (FIG. 5), which contacts rear seat strainer or bulkhead 42 (FIG. 1), to define one portion of a generally triangular cross section of storage battery 22.

As shown in FIG. 3, concave surface 30 of storage battery 22 is formed in one portion of storage battery 22. Storage battery 22 further has generally quadrilateral ends 20 which abut a portion of arcuate ends 18 of gas storage tank 12. Generally quadrilateral ends 20 house circulating blowers 74 shown in FIG. 4. Blowers 74 move cooling air from air inlet 58 (FIG. 3) to air outlets 62.

Figure 2:
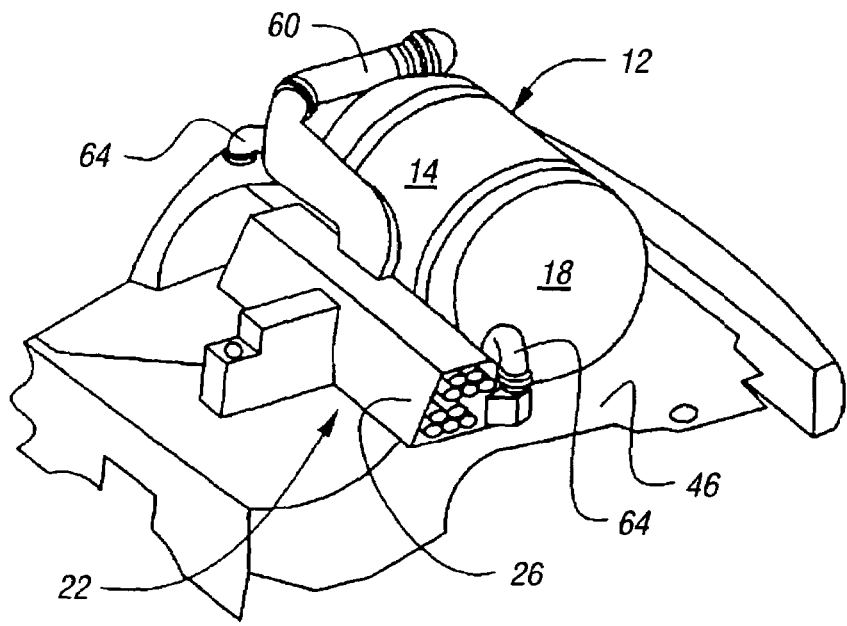
FIG. 2 is a cut-away perspective view of an energy producing and storage system according to the present invention.

FIGS. 1 and 2 illustrate snorkel tube 60, which draws ambient air from an area of the vehicle extending between rear fascia 16 (FIG. 1) and the rearmost portion of the vehicle body. Snorkel tube 60 conducts ambient air into air inlet 58, to allow flow through the interior of storage battery 22 and into air outlets 62, where air is discharged through elbows 64 and into wheehouses 70 (FIG. 1). As an alternative, snorkel tube 60 may have a branch passing through rear seat strainer 42 and into passenger compartment 24. In this case, blowers 74 will draw conditioned air from the passenger cabin and into the interior of battery 22. Battery 22 has a console 34 extending forwardly into the passenger compartment 24. Console 34 includes power electronics and switching contacts for managing the distribution of electrical power associated with battery 22.

FIG. 5 illustrates a sectional view of battery 22 showing three cell groups 50. Each cell group 50 extends axially in a direction parallel to the outer wall 14 of gas storage tank 10. Each cell group 50 comprises a number of cell stacks 54; in one embodiment each cell group 50 includes five cell stacks 54 of roughly D size cells, yielding a total cell count of 180 cells. In one embodiment, nickel metal hydride cells have been useful for producing a battery according to the present invention. The arrangement of cell groups 50 and cell stacks 54 allows cooling air to be readily drawn into air inlet 58 and out through air outlets 62. In the event that heating of cell group 50 is needed due to cool ambient conditions, electric heater 66 is provided within the interior of battery case 26.

The present invention further includes a method for providing an energy storage system for a vehicle, particularly a hybrid electric vehicle or fuel cell vehicle. According to this method, storage battery 22 is secured within a fuel storage compartment adjacent passenger compartment 24 and immediately adjacent rear seat bulkhead 42 and compressed gas tank 12. The triangular cross section of battery 22 takes particular advantage of the space defined in part by compressed gas storage tank 12, by providing a concave surface 30, a slant surface 38, and a lower surface 28 in contact with floor 46. Taken together, slant surface 38, concave surface 30, and lower surface 28 define a generally triangular cross section of storage battery 22. Nesting of a portion of outer cylindrical wall 14 of gas storage tank 10 with concave surface 30 allows storage battery 22 and gas storage tank 12 to occupy a small volume of the vehicle extending behind rear seat bulkhead 42, so as to permit maximum usage of the interior volume of the vehicle.

Figure 6:
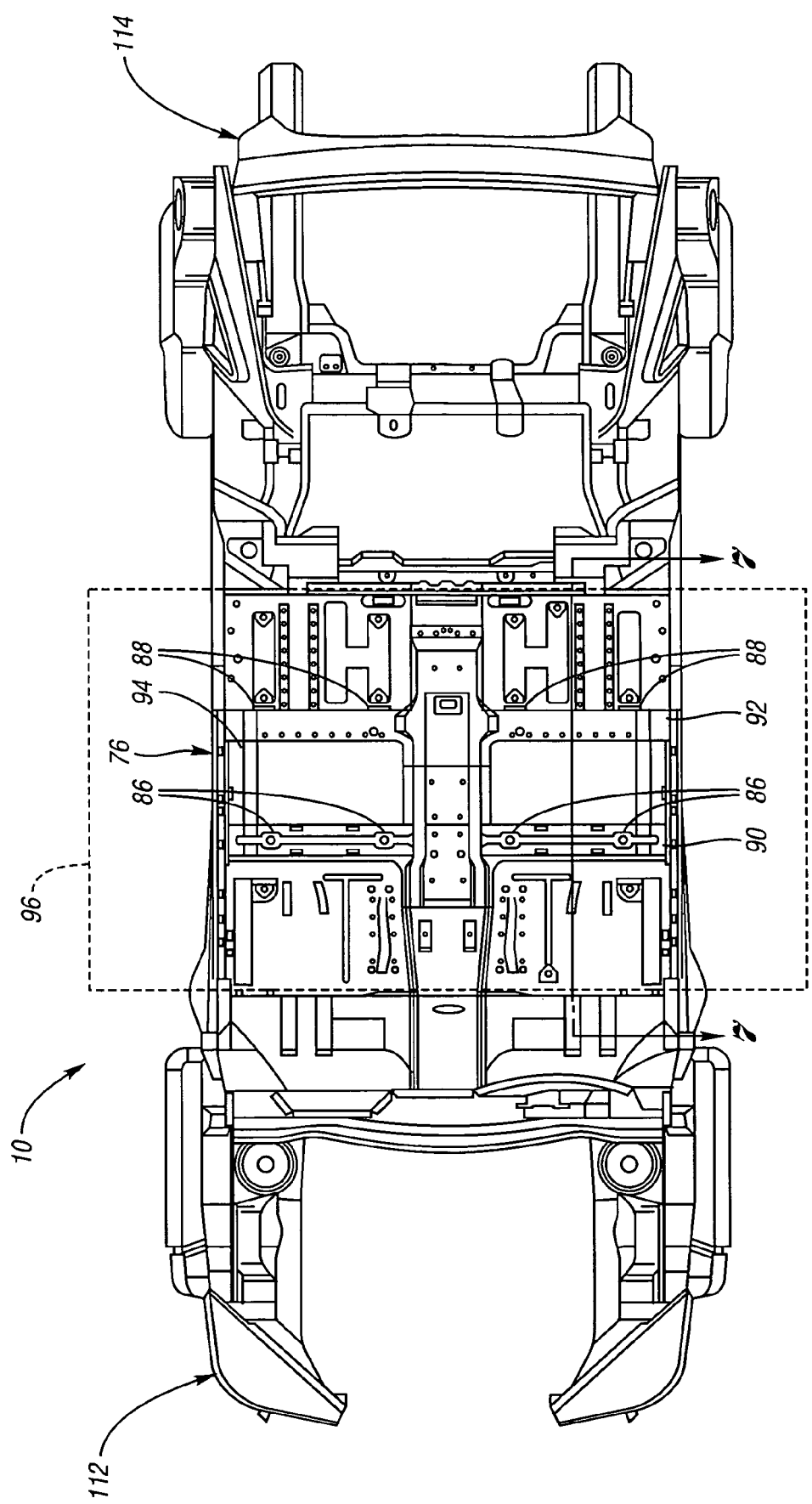
FIG. 6 is a top plan view of a portion of the vehicle shown in FIG. 1.

FIG. 6 shows a portion of the vehicle 10 including vehicle body 76. The vehicle body 76 is a uni-body, although the present invention also contemplates the use of body-on-frame vehicles. Section 7—7 is cut through a portion of the body 76, and is shown in detail in FIG. 7. FIG. 7 illustrates a fuel cell stack 78, which is a third portion of the energy producing and storage system. The fuel cell stack 78 is placed in a first concavity 80 from outside the vehicle 10. The first concavity 80 is formed within the vehicle body 76, and is configured such that when the fuel cell stack 78 is installed, only a small portion of it extends beyond a bottom portion 82 of the vehicle body 76. The first concavity 80 is also configured to minimize use of vehicle occupant space. One way this is accomplished is by disposing the first concavity 80 directly below a front seat 84 of the vehicle 10.

The first concavity 80 has a depth (D1) that can be configured to accommodate particular fuel cell stacks and particular vehicle designs. For example, if a vehicle is being designed from the ground up, appropriate head room may be allowed to increase the depth of a first concavity to receive an entire fuel stack, such that none of the fuel stack extends beyond the vehicle body. Conversely, as shown in FIG. 7, a small portion of the fuel cell stack 78 can be allowed to extend beyond the bottom portion 82 of the vehicle body 76, which allows the fuel cell stack 78 to be fitted into an existing vehicle platform, without making adjustments for passenger head room. As illustrated in the drawing figures, the energy producing and storage system is a fuel cell system, which is configured to be efficiently packaged within a vehicle, such as the vehicle 10.

As shown in FIG. 7, the front seat 84 is attached to two attachment structures, or seat brackets 86, 88. There are actually two pairs of the seat brackets 86,88 for each of the two front seats in the vehicle 10. FIG. 6 shows all four of the seat brackets 86, and all four of the seat brackets 88. As shown in FIG. 6, the vehicle body 76 includes two transverse supports 90, 92, each of which runs across the width of the vehicle 10. The transverse supports 90, 92 may be formed integrally with a vehicle body, such as the body 76, or alternatively, may be separate structures attached to an inside portion 94 of the vehicle body 76. In addition to respectively providing the seat brackets 86, 88, the transverse supports 90, 92 also add strength to the vehicle body 76 in the transverse direction. This helps protect the fuel cell stack 78 in the event of a side impact.

FIG. 6 shows a portion 96 of the vehicle body 76 enclosed by a dashed line. The portion 96 is shown in detail from a bottom view in FIG. 8. As shown in FIG. 8, the vehicle 10 includes a pair of longitudinal supports 98, 100, which can be separately attached to, or integrally formed with, the vehicle body 76. The longitudinal supports 98, 100 add strength to the vehicle body 76 in a longitudinal direction, which can help to protect the fuel cell stack 78 in case of a frontal or rear impact. In addition, the longitudinal supports 98, 100 are configured to receive a mounting bracket 102 of the fuel cell stack 78.

As shown in FIG. 8, the bracket 102 is a single structure which is disposed around a perimeter of the fuel cell stack 78. Of course, the fuel cell stack 78 can be mounted to the longitudinal supports 98, 100, or other portions of the vehicle 10, using any device or devices which are effective to maintain the fuel cell stack in the first concavity 80. In the embodiment shown in FIG. 8, the bracket 102 is attached to the longitudinal supports 98, 100 with threaded fasteners 104. This configuration provides the advantage of allowing the fuel cell stack 78 to be easily removed for servicing.

FIG. 9 shows an alternative embodiment of the present invention, including a portion of a vehicle body 106. The vehicle body 106 includes a first concavity 108 formed therein. In addition, the vehicle body 106 includes a second concavity 110 which is oriented longitudinally along a length of a vehicle. As shown in FIG. 9, the second concavity 110 has a second depth (D2') that is larger than a depth (D1') of the first concavity 108. In this way, the second concavity 110 provides a conduit between front and rear portions of a vehicle (see FIG. 6 illustrating front and rear portions 112, 114 of the vehicle 10). In particular, a fuel cell stack, such as the fuel cell stack 78 can be placed in the first concavity 108 while still allowing room above it in the second concavity 110. This provides a passage for coolant lines, electrical wires, and the like to be conveniently run between the front and rear portions of a vehicle. For example, an electric motor (not shown) could be placed at or near the front of a vehicle, and because of the passage provided by the second concavity 110, the motor could be electrically connected to a battery, such as the battery 22, that is located at or near the rear portion of a vehicle. Thus, the present invention provides compact and efficient storage for a fuel cell system, while still providing the versatility necessary to operate and control a wide variety of vehicle components.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. A vehicle, comprising:
   an energy producing and storage system including first and second portions cooperating in a nesting relationship, thereby minimizing vehicle space usage; and
   a vehicle body including a floor having a first concavity formed therein for receiving a third portion of the system from outside the vehicle, the first concavity being configured to prevent at least some of the third portion from extending beyond the vehicle body, and to minimize use of vehicle occupant space,
   the floor having a second concavity formed therein, the second concavity being oriented longitudinally along a length of the vehicle and having a depth greater than a depth of the first concavity, thereby providing a conduit between a front of the vehicle and a rear of the vehicle.

2. The vehicle of claim 1, further comprising at least one transverse support disposed on an inside of the floor along a length of the first concavity, thereby adding strength to the vehicle body in a transverse direction, the at least one transverse support being configured to provide an attachment structure for a corresponding vehicle front seat.

3. The vehicle of claim 1, wherein the system includes a fuel cell system, and wherein the first portion includes a fuel tank, the second portion includes a storage device for storing and providing electricity, and the third portion includes a fuel cell stack.

4. The vehicle of claim 3, further comprising a pair of longitudinal supports, each of the longitudinal supports being attached to the vehicle body across a corresponding portion of the first concavity, thereby adding strength to the vehicle body in a longitudinal direction, each of the longitudinal supports being configured to receive a corresponding mounting bracket of the fuel cell stack.

5. The vehicle of claim 3, wherein the storage device is a battery, and the nesting relationship between the fuel tank and the battery is defined by a concave portion of the battery disposed along a length of the battery, generally conforming to a convex portion of the fuel tank disposed along a length of the fuel tank.

6. The vehicle of claim 3, wherein the first concavity is oriented generally transverse to the vehicle length, and is disposed below a vehicle front seat.

7. A vehicle having a uni-body construction and configured to efficiently package a fuel cell system, the vehicle comprising:
  a fuel cell system including a fuel cell stack, a fuel tank, and a storage device for storing and providing electricity, the fuel tank and the storage device cooperating in a nesting relationship to minimize vehicle space usage;
  a first concavity formed in a floor of the uni-body, the first concavity being configured to receive the fuel cell stack from outside the vehicle; and
  a second concavity formed in the floor of the uni-body and oriented longitudinally along a length of the vehicle, the second concavity having a depth greater than a depth of the first concavity, thereby providing a conduit between a front of the vehicle and a rear of the vehicle.

8. The vehicle of claim 7, wherein the storage device is a battery, and the nesting relationship between the fuel tank and the battery is defined by a concave portion of the battery disposed along a length of the battery, generally conforming to a convex portion of the fuel tank disposed along a length of the fuel tank.

9. The vehicle of claim 8, wherein the first concavity is oriented generally transverse to the vehicle length, and is disposed below a vehicle front seat.

10. The vehicle of claim 9, further comprising a pair of longitudinal supports attached to the uni-body, each of the longitudinal supports being disposed across a corresponding portion of the first concavity, thereby adding strength to the uni-body in a longitudinal direction, each of the longitudinal supports being configured to receive a corresponding mounting bracket of the fuel cell stack.

11. The vehicle of claim 9, further comprising at least one transverse support disposed on an inside portion of the uni-body along a length of the first concavity, thereby adding strength to the uni-body in a transverse direction, the at least one transverse support being configured to provide an attachment structure for a corresponding vehicle front seat.

12. A method for packaging an energy producing and storage system in a vehicle, the vehicle including a vehicle body having a floor with first and second concavities formed therein, the second concavity being oriented longitudinally along a length of the vehicle and having a depth greater than a depth of the first concavity, thereby forming an open space above the first concavity, the method comprising:
  placing first and second portions of the system together in a nesting relationship, thereby minimizing vehicle space usage;
  placing a third portion of the system in the first concavity from outside the vehicle such that at least some of the third portion does not extend beyond the vehicle body; and
  placing at least one of a coolant line or an electrical wire through the open space above the first concavity.

13. The method of claim 12, wherein the vehicle further includes at least one transverse support disposed along an inside of the floor along a length of the first concavity, the method further comprising attaching at least one vehicle front seat to the at least one transverse support.

14. The method of claim 12, wherein the system includes a fuel cell system, and wherein the first portion includes a fuel tank, the second portion includes a storage device for storing and providing electricity, and the third portion includes a fuel cell stack.

15. The method of claim 14, wherein placing the first and second portions of the system together in a nesting relationship includes placing a concave portion of the battery adjacent a convex portion of the fuel tank, the concave portion of the battery being disposed along a length of the battery, the convex portion of the fuel tank being disposed along a length of the fuel tank.

16. The method of claim 14, wherein the vehicle further includes a pair of longitudinal supports attached to the vehicle body across a corresponding portion of the first concavity, and the fuel cell includes at least one mounting bracket, the method further comprising attaching the at least one fuel cell mounting bracket to a corresponding longitudinal support.

* * * * *